United States Patent [19]

Akashi et al.

[11] Patent Number: 5,194,888

[45] Date of Patent: Mar. 16, 1993

[54] CAMERA WITH FOCUS AND HAND TREMBLING DETECTING APPARATUS

[75] Inventors: Akira Akashi; Yukio Odaka, both of Yokohama, Japan

[73] Assignee: Canon Kabushiki Kaisha, Tokyo, Japan

[21] Appl. No.: 647,543

[22] Filed: Jan. 29, 1991

[51] Int. Cl.[5] .............................................. G03B 13/36
[52] U.S. Cl. ..................... 354/402; 354/430; 354/195.1
[58] Field of Search ............... 354/400, 402, 403, 430, 354/195.1

[56] References Cited

U.S. PATENT DOCUMENTS

| | | |
|---|---|---|
| 4,345,825 | 8/1982 | Matteson et al. ............... 354/195.1 |
| 4,709,138 | 11/1987 | Suda . |
| 4,733,264 | 3/1988 | Hatase et al. ...................... 354/430 |
| 4,772,117 | 9/1988 | Matsui . |
| 4,801,962 | 1/1989 | Akashi . |
| 4,845,521 | 7/1989 | Akashi ................................. 354/400 |
| 4,941,009 | 7/1990 | Yoshida ............................... 354/403 |
| 4,980,716 | 12/1990 | Suzuki et al. ....................... 354/403 |
| 5,017,955 | 5/1991 | Kotani ................................. 354/400 |

FOREIGN PATENT DOCUMENTS

| | | |
|---|---|---|
| 427292 | 11/1990 | European Pat. Off. . |
| 60-166910 | 8/1985 | Japan . |
| 60-166911 | 1/1986 | Japan . |
| 63-018314 | 1/1988 | Japan . |
| 2-064517 | 3/1990 | Japan . |

Primary Examiner—Russell E. Adams
Attorney, Agent, or Firm—Fitzpatrick, Cella, Harper & Scinto

[57] ABSTRACT

A camera with focus detecting and hand trembling detecting apparatus includes a focus detecting device for automatic focusing and a hand trembling detection circuit for detecting the hand trembling state of the camera. At the hand trembling detection by the hand trembling detection circuit, the automatic focusing is automatically switched from the servo mode to the one-shot mode, thus enabling exact hand trembling detection.

13 Claims, 11 Drawing Sheets

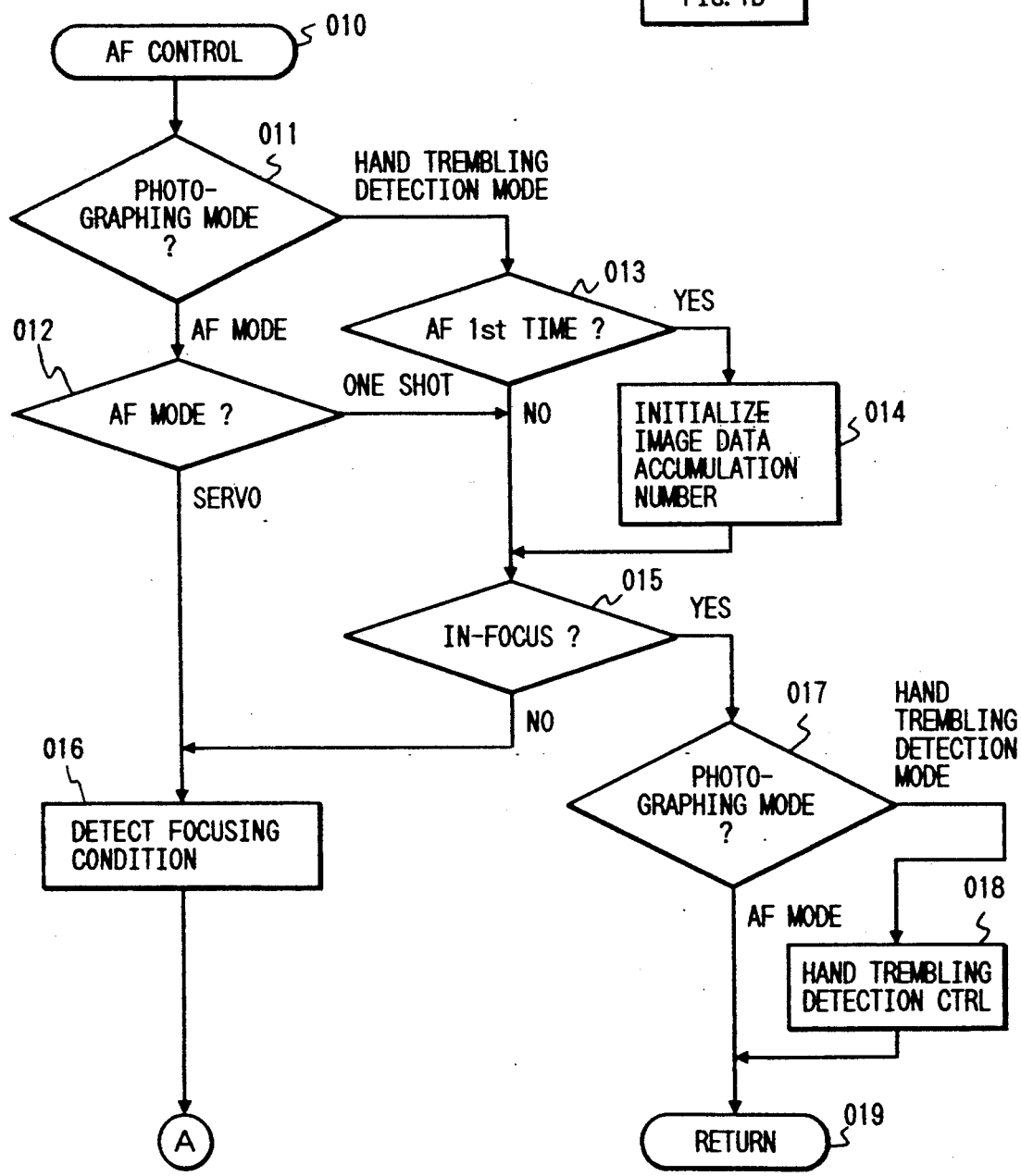

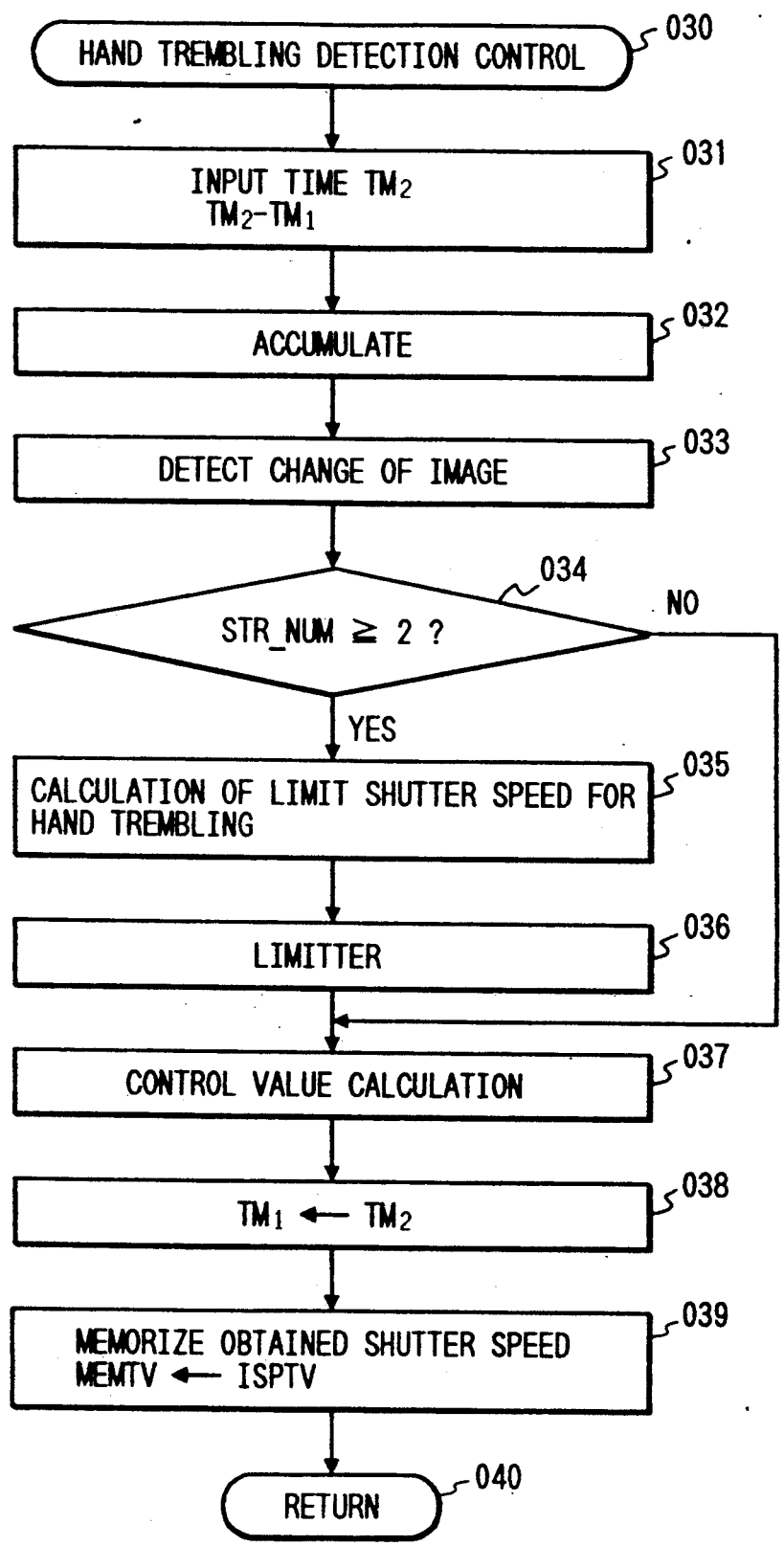

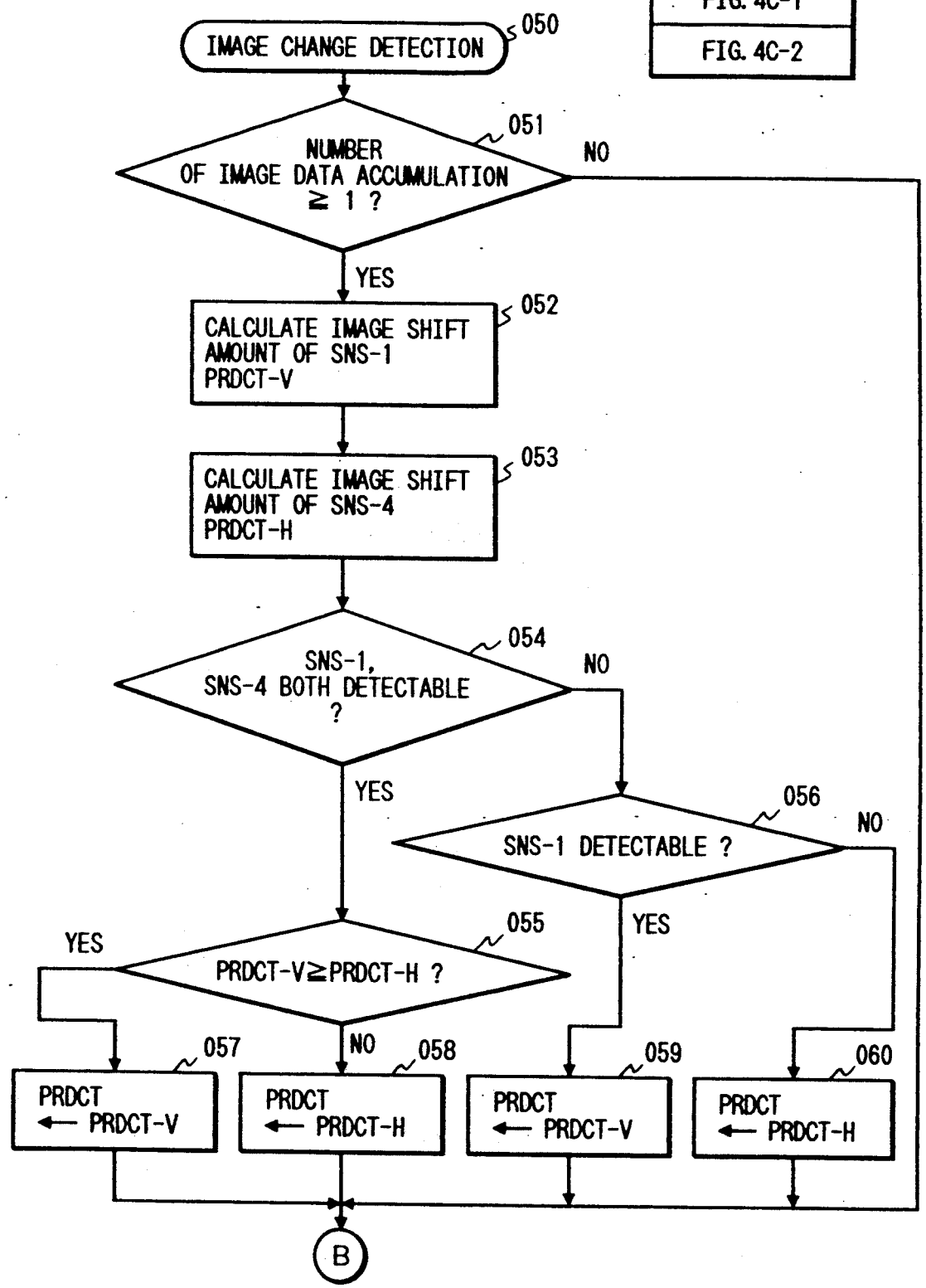

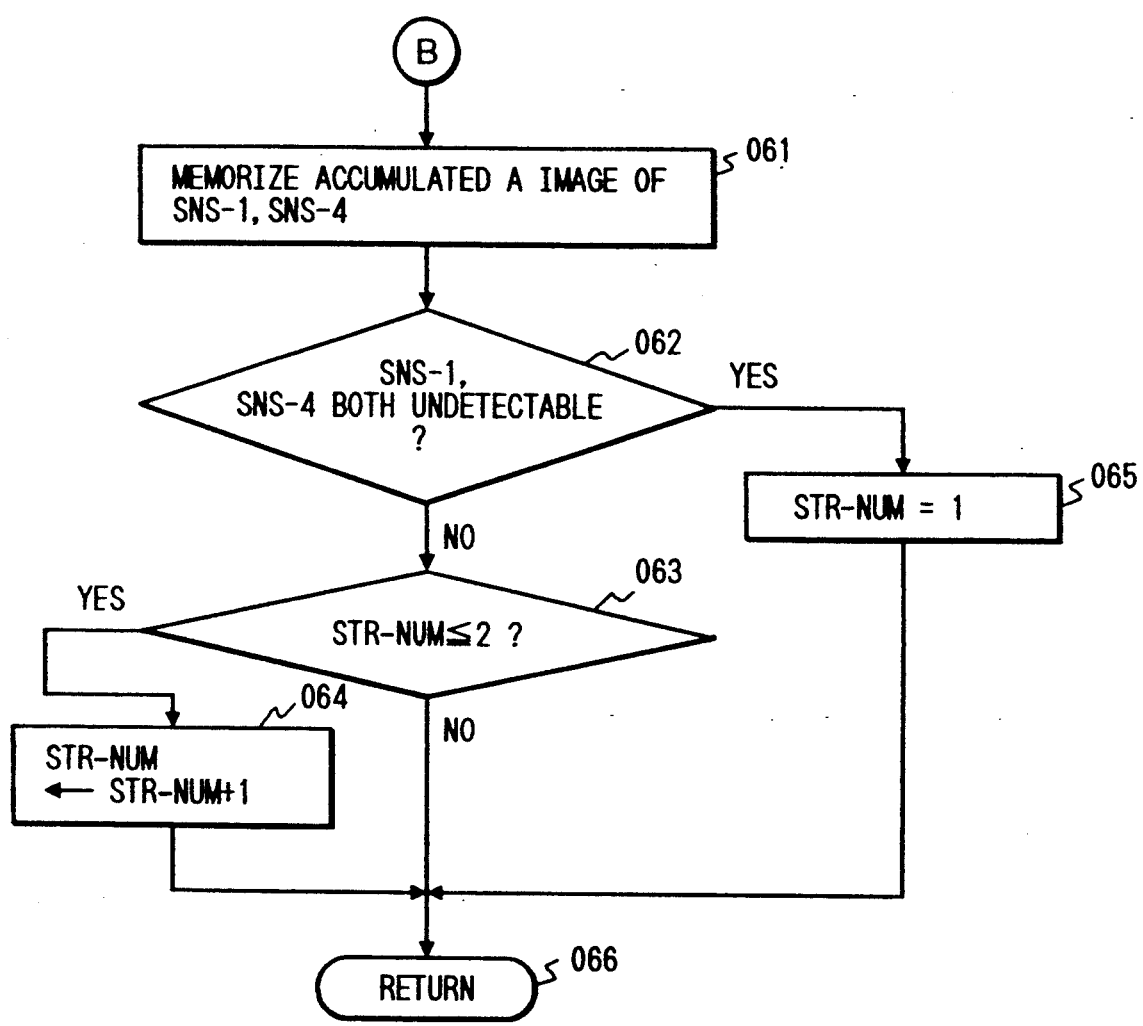

CAMERA WITH FOCUS AND HAND TREMBLING DETECTING APPARATUS

BACKGROUND OF THE INVENTION

1. Field of the Invention

The present invention relates to a camera capable of detecting the amount of hand trembling of the photographer by means of a focus detecting device.

2. Related Background Art

There are already proposed various cameras capable of detecting the amount of hand trembling of the photographer by means of a focus detecting device, for example as disclosed in the Japanese Laid-Open Patents Sho 60-166911 and Sho 60-166910 of the present assignee.

Such conventional examples are constructed so as to first focus the lens to an object by an automatic focusing operation, and then to detect the hand trembling in a state where the focusing is fixed.

Such an automatic focusing camera is naturally designed to effect an automatic focusing operation in the first place, and is generally capable, for the automatic focusing operation, of selecting either a mode in which the focusing operation is no longer conducted once the focused state is reached (hereinafter called "one-shot mode") or a mode in which the focusing operation is repeated regardless of whether the focused state is reached or not (hereinafter called "servo mode").

Also, such auto focusing cameras are generally equipped with illuminating means for illuminating the object in auxiliary manner in a situation where the focus state cannot be detected in the automatic focusing operation (such means being hereinafter called "auxiliary light"), in order to effect the automatic focusing as far as possible.

Unless the hand trembling detection is conducted with a fixed focus state after the focusing operation is conducted, the image signal to be used as data for detecting the hand trembling cannot provide a value suitable for such detection, so that exact detection of hand trembling becomes impossible. Consequently, in a camera capable of selecting either the "servo" or the "one-shot" auto focusing mode, exact detection of hand trembling cannot be realized if the servo mode is selected.

Also in the case where the focus state cannot be detected, the focusing may be achieved by the emission of auxiliary light, but the detection of hand trembling cannot be realized by such a method. Such an auxiliary lighting unit is either integrated with the camera, or, even if constructed separately, is fixed to the camera in use. Consequently, the auxiliary light vibrates when the camera vibrates, so that the hand trembling cannot be detected by the emission of auxiliary light. Thus, the emission of the auxiliary light for focusing preceding the hand trembling detection will be meaningless and merely a waste of energy.

SUMMARY OF THE INVENTION

One aspect of the present invention is to provide a camera in which the auto focusing mode is forcedly shifted to the one-shot mode at the detection of hand trembling, even if the servo mode is selected.

Another aspect of the present invention is to provide a camera which, at the detection of hand trembling, inhibits the emission of auxiliary light in the automatic focusing operation even if the focus state detection becomes impossible due to a low contrast situation, thereby preventing unnecessary electric power consumption.

Still other aspects of the present invention will become fully apparent from the following description of the embodiments, to be taken in conjunction with the attached drawings.

BRIEF DESCRIPTION OF THE DRAWINGS

FIGS. 4A to 4G are flow charts showing the function of the camera of the present invention.

DETAILED DESCRIPTION OF THE PREFERRED EMBODIMENTS

Now, the present invention will be clarified in detail by preferred embodiments thereof shown in the attached drawings.

Figure 3:
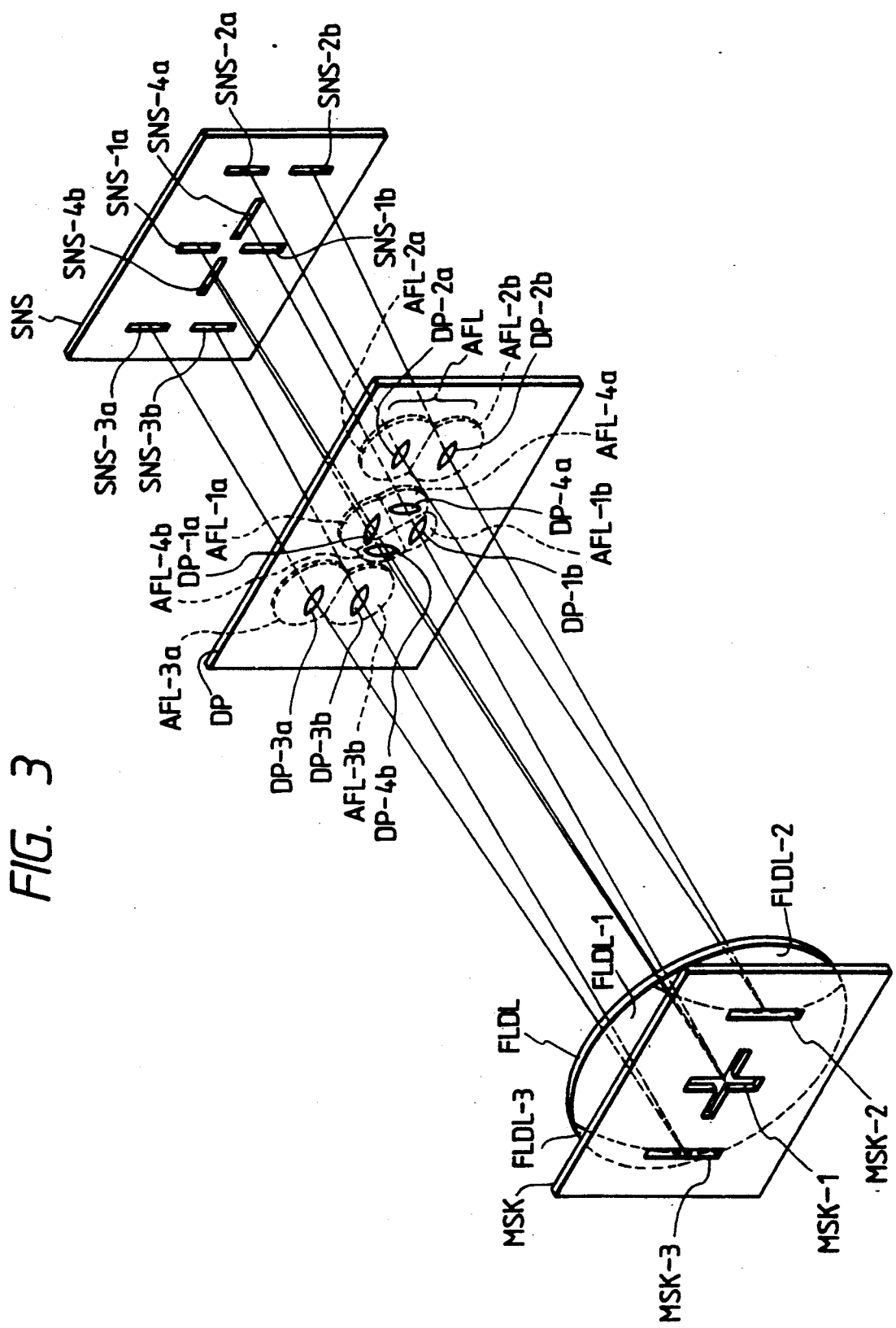
FIG. 3 is a schematic perspective view of an embodiment of a focus detecting optical system employed in the camera shown in FIG. 2.

FIG. 3 schematically illustrates a focus detecting device embodying the present invention.

Referring to FIG. 3, a field mask MSK is provided, at the center thereof, with a cross-shaped aperture MSK-1, and, at both sides, with vertically oblong apertures MSK-2, MSK-3. A field lens FLDL is composed of three portions FLDL-1, FLDL-2, FLDL-3 respectively corresponding to the three apertures MSK-1, MSK-2, MSK-3 of the field mask. A diaphragm DP is provided, at the center, with four apertures DP-1a, DP-1b, DP-4a, DP-4b paired in vertical and horizontal directions, and, in lateral areas, with two pairs of apertures DP-2a, DP-2b and DP-3a, DP-3b. The areas FLDL-1, FLDL-2, FLDL-3 of said field lens FLDL are adapted to focus the images of said paired apertures DP-1, DP-4, DP-2, DP-3 in the vicinity of the exit pupil of an unrepresented objective lens. Secondary imaging lenses AFL, comprising eight lenses AFL-1a, AFL-1b, AFL-4a, AFL-4b, AFL-2a, AFL-2b, AFL-3a, AFL-3b in four pairs, are positioned respectively corresponding to and behind the apertures of the diaphragm DP. A sensor SNS has eight sensor arrays SNS-1a, SNS-1b, SNS-4a, SNS-4b, SNS-2a, SNS-2b, SNS-3a, SNS-3b in four pairs, which are positioned respectively corresponding to the secondary imaging lenses AFL, for receiving the images formed thereby.

In the focus detecting system shown in FIG. 3, if the focal point of the phototaking lens is positioned in front of or behind the film plane, the object images formed on the paired sensor arrays are positioned mutually closer or farther, respectively. As the displacement of mutual positions of said object images is related by a certain function with the defocus amount of the phototaking lens, said defocus amount of the lens can be detected by applying suitable calculations on the outputs of each pair of the sensor arrays.

The above-explained structure enables the distance to be measured, in the central region of the field photographed or observed by the unrepresented objective lens, even to an object showing a change in light the amount distribution only in the vertical or horizontal direction, and enables the distance of an object positioned corresponding to the aperture MSK-2 or MSK-3 in the peripheral part of the field mask to be measured.

Figure 2:
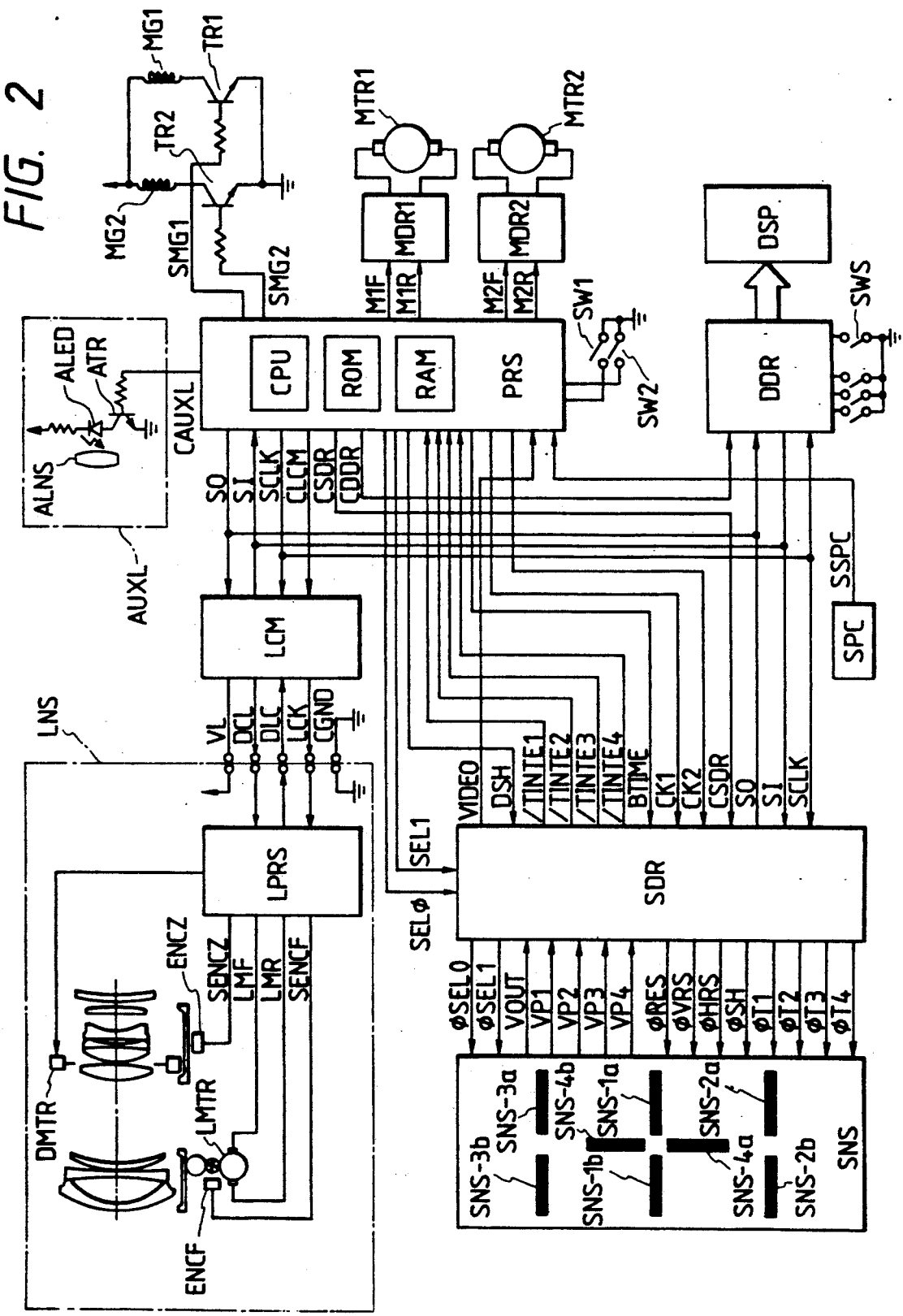
FIG. 2 is a circuit diagram of an embodiment of the camera of the present invention.

FIG. 2 is a circuit diagram of a specific example of a camera equipped with the focus detecting device shown in FIG. 3.

Referring to FIG. 2, a control processor PRS of the camera is composed, for example, of a one-chip microcomputer incorporating therein a CPU (central processing unit), a ROM, a RAM and an A/D converter. The microcomputer PRS executes various controls of the camera such as auto exposure control, auto focusing control, winding and rewinding of film etc. according to a sequence program stored in the ROM, communicating with various peripheral circuits of the camera body and a controller in the lens by means of communications SO, SI, SCLK and communication selection signals CLCM, CSDR, CDDR and controlling the functions of said circuits and lens.

SO and SI are data signals respectively released from or supplied to the microcomputer PRS, and SCLK is a clock signal for the signals SO, SI.

A lens communication buffer circuit LCM supplies a lens power terminal, VL with electric, power when the camera is functioning, and functions as a communication buffer between the camera and the lens when the selection signal CLCM from the microcomputer PRS is at a high potential level (hereinafter represented as "H" level, whereas a low potential state will be represented as "L" level).

When the microcomputer PRS shifts the selection signal CLCM to the "H" level state and releases predetermined data as the signal SO in synchronization with the clock signal SCLK, the buffer circuit LCM sends buffer signals LCK, DCL respectively corresponding to the signals SCLK, SO to the lens through communication contacts between the camera and the lens. At the same time, it releases, corresponding to a signal DLC from the lens LNS, a buffered signal as the signal SI, and the microcomputer PRS fetches said signal SI as the lens data, in synchronization with the signal SCLK.

A switch detecting and displaying circuit DDR is selected when the signal CDDR is at the "H" level state, and is controlled by the microcomputer PRS by means of the signals SO, SI, SCLK. More specifically, it switches the display of a display device DSP of the camera according to the data from the microcomputer PRS, and informs the microcomputer PRS of the on/off states of various operating members of the camera through communication procedures.

Switches SW1, SW2 are linked with an unrepresented shutter release button, and are respectively closed by the depression of said button over a first stroke and a successive, further second stroke. The microcomputer PRS executes light metering and auto focusing in response to the closing of the switch SW1, and exposure control and film winding thereafter, in response to the closing of the switch SW2.

The switch SW2 is connected to an interruption input port of the microcomputer PRS, so that the closing of said switch SW2 immediately activates a predetermined interruption program even while another program is being executed in response to the closing of the switch SW1.

A film feeding motor MTR1 and a mirror up/down and shutter charging motor MTR2 are driven in forward or reverse directions respectively by drive circuits MDR1, MDR2, in response to motor control signals M1F, M1R, M2F, M2R received from the microcomputer PRS.

Solenoids MG1, MG2 for starting the leading and trailing curtains of the shutter are energized by signals SMG1, SMG2 through amplifying transistors TR1, TR2. Thus, the shutter is controlled by the microcomputer PRS.

The switch detecting and displaying circuit DDR, motor drive circuits MDR1, MDR2, and shutter control will not be explained in detail, as they are not directly related with the present invention.

An in-lens control circuit LPRS receives command data sent from the camera to the photo-taking lens LNS by a signal DCL supplied in synchronization with the clock signal LCK, and the operations of the lens are predetermined corresponding to such command data. Analyzing said command data according to predetermined procedures, the control circuit LPRS executes focusing or diaphragm adjustment, or releases the function status of the lens (state of the focusing optical system or of the diaphragm) or various parameters (fully-open F-number, focal length, coefficient between the defocus amount and the amount of movement of focusing optical system etc.) as output signals DLC.

A zoom lens is employed in the present embodiment. In case a focusing command is sent from the camera, a focusing motor LMTR is driven by signals LMF, LMR simultaneously received and indicating the amount and direction of lens drive, thereby axially moving the focusing optical system and thus achieving a focusing operation. The amount of movement of said optical system is monitored by detecting the pattern of a pulse plate rotated in linkage with the optical system by a photocoupler, and counting pulse signals SENCF of an encoder circuit ENCF generating pulses of a number corresponding to the amount of movement by a counter in the circuit LPRS. When said count reaches an amount of movement requested of the circuit LPRS, it shifts the signals LMF, LMR to the "L" level state, thereby controlling the motor LMTR.

Therefore, once a focusing command is sent from the camera, the microcomputer PRS thereof need not be involved in the lens driving until it is completed. Also, in case of a request from the camera, the content of said counter can be supplied to the camera.

In case a diaphragm control command is sent from the camera, a stepping motor DMTR known for diaphragm control is driven according to the number of stops of diaphragm control sent simultaneously. Since an open control is possible for the stepping motor, an encoder for monitoring the function thereof is not required.

An encoder circuit ENCZ is attached to the zoom optical system. The circuit LPRS detects the zoom position by receiving a signal SENCZ from said encoder circuit ENCZ. The circuit LPRS stores lens parameters in different zoom positions and can send said parameters corresponding to the current zoom position to the camera in case of a request from the microcomputer PRS thereof.

A light metering sensor SPC adapted for exposure control by receiving the light coming from the object through the phototaking lens sends an output signal SSPC to an analog input port of the microcomputer PRS, and said signal is used, after A/D conversion, for automatic exposure control.

A drive circuit SDR for the focus detecting line sensor SNS is selected at the "H" level state of a signal CSDR, and is controlled by the microcomputer PRS by means of the signal SO, SI, SCLK.

The signals SEL0, SEL1 supplied from the microcomputer PRS to the drive circuit SDR are transmitted as signals $\phi$SEL0, $\phi$SEL1 to the sensor SNS. These signals select the paired sensor arrays SNS-1 (SNS-1a, SNS-1b) when $\phi$SEL0="L" and $\phi$SEL1="L", the paired sensor arrays SNS-4 (SNS-4a, SNS-4b) when $\phi$SEL0="H" and $\phi$SEL1="L", the paired sensor arrays SNS-2 (SNS-2a, SNS-2b) when $\phi$SEL0="L" and $\phi$SEL1="H", or the paired sensor arrays SNS-3 (SNS-3a, SNS-3b) when $\phi$SEL0="H" and $\phi$SEL1="H".

After the charge accumulation, the signals SEL0, SEL1 are suitably selected, and clock signals $\phi$SH, $\phi$HRS are supplied to serially release image signals as an output signal VOUT, from the paired sensor arrays selected by said signals SEL0, SEL1 (or $\phi$SEL0, $\phi$SEL1).

Monitor signals VP1, VP2, VP3, VP4 from object luminance monitoring sensors positioned respectively close to the paired sensor arrays SNS-1 (SNS-1a, SNS-1b), SNS-2 (SNS-2a, SNS-2b), SNS-3 (SNS-3a, SNS-3b), SNS-4 (SNS-4a, SNS-4b) are elevated in voltage simultaneously with the start of charge accumulation, whereby the charge accumulation control for said sensor arrays is achieved.

There are also provided sensor resetting clock signals $\phi$RES, $\phi$VRS; image signal readout clock signals $\phi$HRS, $\phi$SH; and clock signals $\phi$T1, $\phi$T2, $\phi$T3, $\phi$T4 for terminating the charge accumulation of the paired sensor arrays.

An output signal VIDEO of the sensor drive circuit SDR is obtained by subtracting the dark current from the image signal VOUT from the sensor SNS and amplifying the obtained difference with a gain determined by the luminance of the object. Said dark current is obtained as the output from shielded pixels in the sensor arrays, and the drive circuit SDR retains said output in a capacitor in response to a signal DSH from the microcomputer PRS and effects differential amplification with said image signal. The output signal VIDEO is supplied to an analog input port of the microcomputer PRS, then A/D converted therein and stored as digital values in succession in predetermined addresses of the RAM.

Signals /TINTE1, /TINTE2, /TINTE3, /TINTE4 indicate that the charge accumulation is completed with an appropriate amount of charge respectively in the paired sensor arrays SNS-1 (SNS-1a, SNS-1b), SNS-2 (SNS-2a, SNS-2b), SNS-3 (SNS-3a, SNS-3b), SNS-4 (SNS-4a, SNS-4b), and the microcomputer PRS executes the readout of the image signals in response to said signals.

A signal BTIME defines the timing for determining the readout gain of an image signal amplifier in the sensor drive circuit SDR, which determines, based on the voltages of the monitors signals VP0-VP3 when said signal BTIME assumes the "H" level state, the readout gain of the corresponding paired sensor arrays.

Reference clock signals CK1, CK2 are supplied from the microcomputer PRS to the sensor drive circuit SDR, for generating the above-mentioned clock signals $\phi$RES, $\phi$VRS, $\phi$HRS, $\phi$SH.

The charge accumulating operation of the sensor SNS is started by the microcomputer PRS, by shifting a communication selection signal CSDR to the "H" level state and sending a predetermined "accumulation start command" to the sensor drive circuit SDR.

Thus, the object images formed on four pairs of photosensor arrays are photoelectrically converted to accumulate charges in the photoelectric converting elements of the sensor. At the same time the signals VP1-VP4 of the luminance monitoring sensors are elevated in voltage, and, upon reaching a predetermined level, the sensor drive circuit SDR shifts said signals /TINTE1-TINTE4 individually to the "L" level state.

In response, the microcomputer PRS releases the clock signal CK2 of a predetermined wave form. In response the sensor drive circuit SDR provides the sensor SNS with the clock signals $\phi$SH, $\phi$HRS, and the sensor SNS releases the image signal according to said clock signals. The microcomputer PRS converts, by the internal A/D converter, the output signal VIDEO received at the analog input port in synchronization with the clock signal CK2 released by the microcomputer PRS itself, and stores the obtained digital signal in succession in predetermined addresses of the RAM.

The functions of the sensor drive circuit SDR and the sensor SNS will not be explained in detail, as they were already disclosed in the Japanese Laid-Open Patent Sho 63-216905 in relation to a focus detecting device having two pairs of sensor arrays.

An auxiliary lighting unit AUXL is provided for illuminating the object when the focus detection is impossible. When an output port CAUXL of the microcomputer PRS is shifted to the "H" level state, a transistor ATR is turned on through a resistor, thus activating a light-emitting diode ALED. The light emitted by said diode illuminates the object pattern through an auxiliary lighting lens ALNS.

As explained in the foregoing, the microprocessor PRS receives the information of the object images formed on the pairs of sensor arrays and effects predetermined calculations for focus detection, thereby determining the defocus amount of the phototaking lens.

Figure 4A:
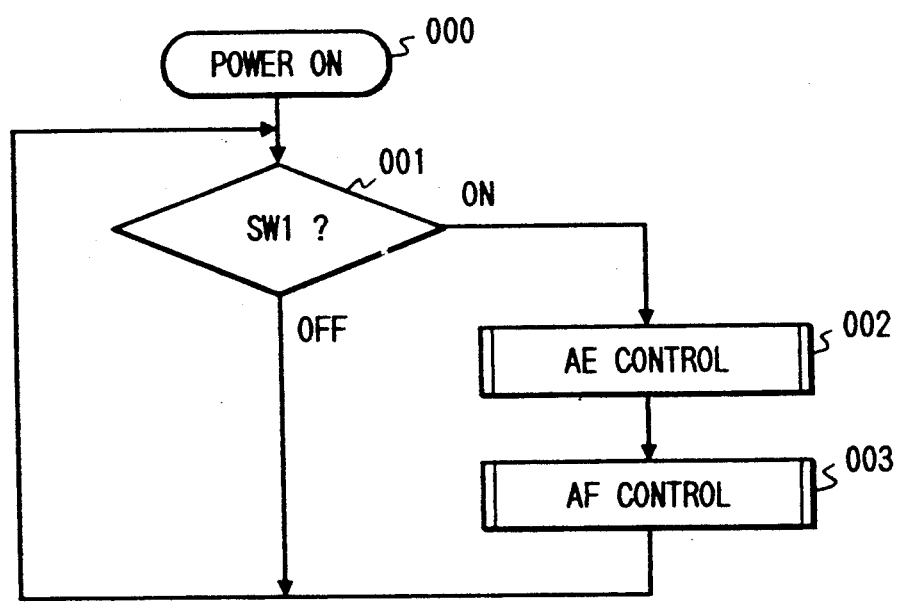

FIG. 4A is an overall flow chart of the control sequence of the entire camera.

When the circuit shown in FIG. 2 is powered, the microcomputer PRS starts execution of the sequence starting from a step (000) in FIG. 4A. A step (001) discriminates the state of the switch SW1 to be closed by the depression of the shutter release button over the first stroke, and, if it is off, said step (001) is repeated. If it is on, the sequence proceeds to a step (002) to initiate the functions of the camera.

The step (002) executes an "AE control" subroutine including light metering, state detections for various switches, display etc. Although the details of said subroutine will not be explained since the AE control is not directly related to the present invention, this subroutine recognizes the state of switches of the aforementioned switch group SWS through the switch detecting circuit DDR, and sets the auto focusing operation to be explained later, according to predetermined conditions. More specifically, this subroutine selects either the auto focusing operation or the hand tremble detection, and, in case of the focusing operation, either the one-shot mode (focusing being interrupted once the focused state is reached) or the servo mode (focusing being repeated regardless of whether the focused state is reached or not). Thus, said switch group SWS selects either the AF operation mode or the hand tremble detection mode, and either the one-shot mode or the servo mode. Upon completion of the "AE control" subroutine, the sequence proceeds to a step (003).

The step (003) executes an "AF control" subroutine, including sensor charge accumulation, focus detecting calculation, automatic lens focusing, and hand trembling detection. Upon completion of said subroutine, the sequence returns to the step (001) and repeats the steps (002) and (003) until the power supply is turned off.

This flow chart does not describe the shutter releasing operation, as it is not directly related to the present invention.

Figure 1B:
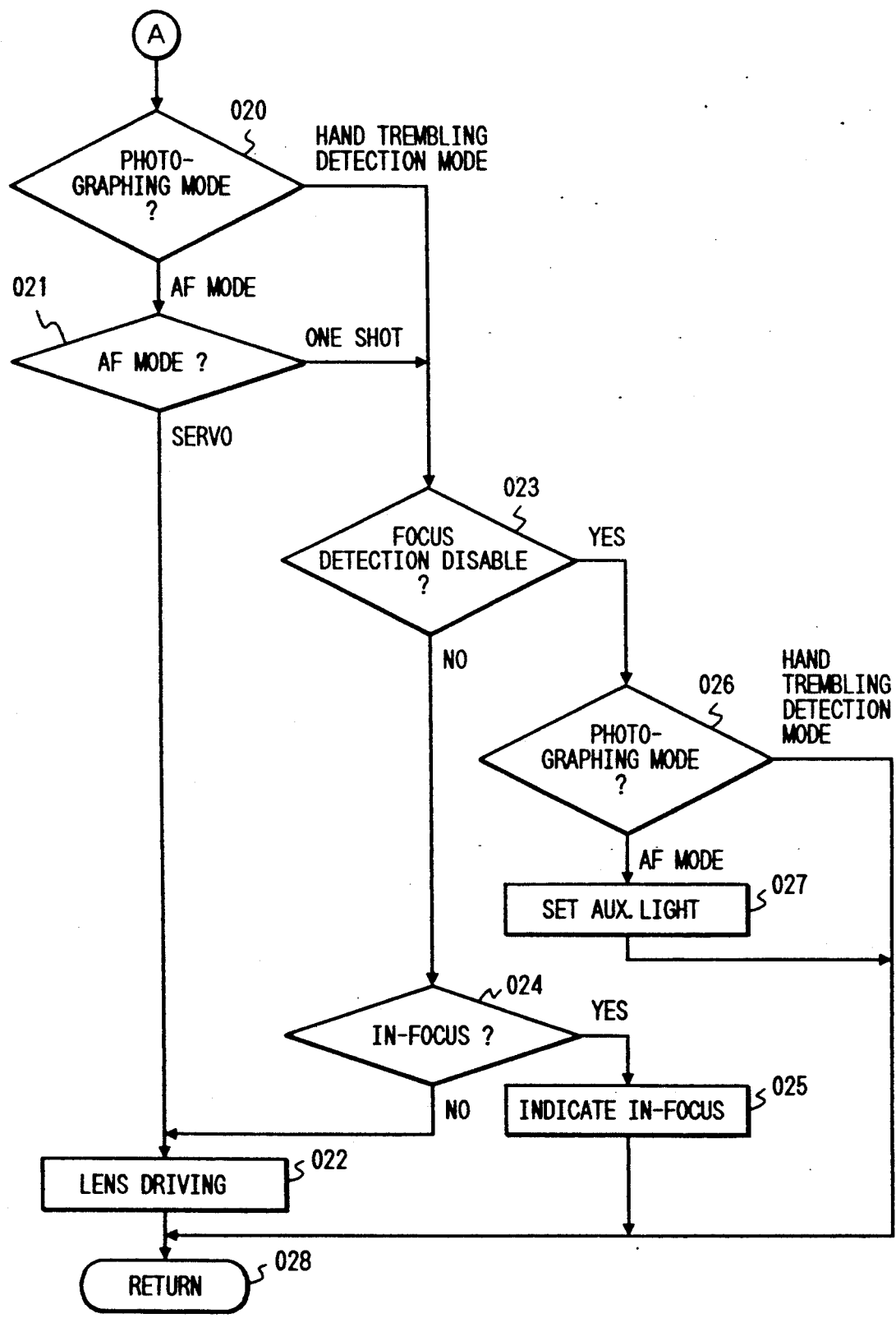
FIGS. 1a and fb (combined as FIG. 1) are flow charts showing sequence of an embodiment of the camera of the present invention.

FIG. 1 is a flow chart of said "AF control" subroutine executed in the above-mentioned step (003).

When said subroutine is called, the AF control is executed from a step (010).

At first a step (011) discriminates whether the photographing mode is the AF mode or the hand trembling detection mode, and, if the AF mode is selected, the sequence proceeds to a step (012) for discriminating the set AF mode.

If the above-mentioned one-shot AF mode is selected, the sequence branches to a step (015) to discriminate whether the in-focus state has been reached in the preceding cycle. If the servo AF mode is selected or if the in-focus state has not been reached in the preceding cycle in the one-shot mode, a step (016) executes a "focus state detection" subroutine.

Said "focus state detection" subroutine detects the defocus amounts in four object areas of the present embodiment. Details of its function will be omitted as they are disclosed in the Japanese Patent Application Hei 1-291131 of the present applicant assignee.

If the step (011) identifies the hand trembling detection mode, the sequence branches to a step (013).

The step (013) discriminates whether the "AF control" subroutine is executed for the first time, and, if, it is the first time, a step (014) initializes the number of accumulations of image data.

If the photographing mode is the hand trembling detection mode, the sequence proceeds through the steps (013) and (014) to the step (015), in order to effect a same operation in the hand trembling detection mode, as in the AF photographing mode and in the one-shot AF mode.

If the step (015) identifies that the in-focus state has been reached in the preceding cycle, the sequence branches to a step (017) for discriminating the photographing mode.

In case of the AF photographing mode, the sequence proceeds to a step (019) in order not to effect the AF operation after the in-focus state is reached, and the "AF control" subroutine is terminated. In case of the hand trembling detection mode, the sequence proceeds to a step (018) to execute a "hand trembling detection control" subroutine, which, as will be later explained in more detail, executes the hand trembling detection with a fixed focus state instead of auto focusing, after the in-focus state has once been reached.

Upon completion of the "focus state detection" subroutine in the step (016), the sequence proceeds to a step (020) for again discriminating the photographing mode. In case of the AF photographing mode, the sequence proceeds to a step (021) to discriminate the AF mode.

In case of the servo AF mode, a step (022) executes a "lens drive" subroutine.

Said subroutine drives the phototaking lens according to the defocus amount obtained in the step (016), but this driving method will not be explained in detail, as it is already disclosed for example in the Japanese Patent Application Sho 61-160824 of the present assignee.

In case the step (020) identifies the hand trembling detection photographing mode or the step (021) identifies the one-shot AF mode, the sequence branches to a step (023). Thus, the operation in case the in-focus state is not yet reached in the hand trembling detection mode is the same as that in the one-shot AF mode.

The step (023) discriminates whether the focus detection in the "focus state detection" subroutine in the previous step (016) has been possible, and the sequence proceeds to a step (024) or (026) respectively if said focus detection has been possible or impossible.

If the focus detection has been possible, a step (024) discriminates whether the detected defocus amount is within the in-focus range, and, if in-focus, a step (025) displays the in-focus state within the view finder. If not in-focus, the sequence proceeds to a step (022) to execute the "lens drive" subroutine.

If the step (023) identifies that the focus detection has been impossible, a step (026) again discriminates the photographing mode, and, if it is the hand trembling detection mode, the sequence proceeds to a step (028) to terminate the "AF control" subroutine.

In case of the AF photographing mode, the sequence proceeds to a step (027) for setting the use of the auxiliary lighting at the next focus detection since the focus detection was impossible this time. With said setting, the auxiliary light is emitted to illuminate the object at the charge accumulating operation of the sensor in the "focus state detection" subroutine of the step (016). The auxiliary lighting is naturally turned off after the charge accumulation.

Thus the steps (026) and (027) inhibit the use of auxiliary light in the hand trembling detection mode, even if the focus detection is impossible.

In summary, the "AF control" subroutine executes, if the AF photographing mode is selected, the automatic focusing according to such selection. If the hand trembling detection mode is selected as the photographing mode, the subroutine executes the automatic focusing in the same manner as in the one-shot AF mode to obtain an in-focus state, and thereafter repeats the hand trembling detection with a fixed focus state.

FIG. 4B is a flow chart of the "hand trembling detection control" subroutine executed in the above-mentioned step (018).

When said subroutine is called, the following hand trembling detection control is executed, starting from a step (030).

At first a step (031) fetches the current time TM2 by reading the value of a free running 16-bit counter incorporated in the microcomputer PRS and calculates an interval TM2-TM1 of the execution of said subroutine, wherein TM1 is the time of preceding execution of said subroutine. Then a step (032) executes an "accumulation" subroutine.

Figure 4D:
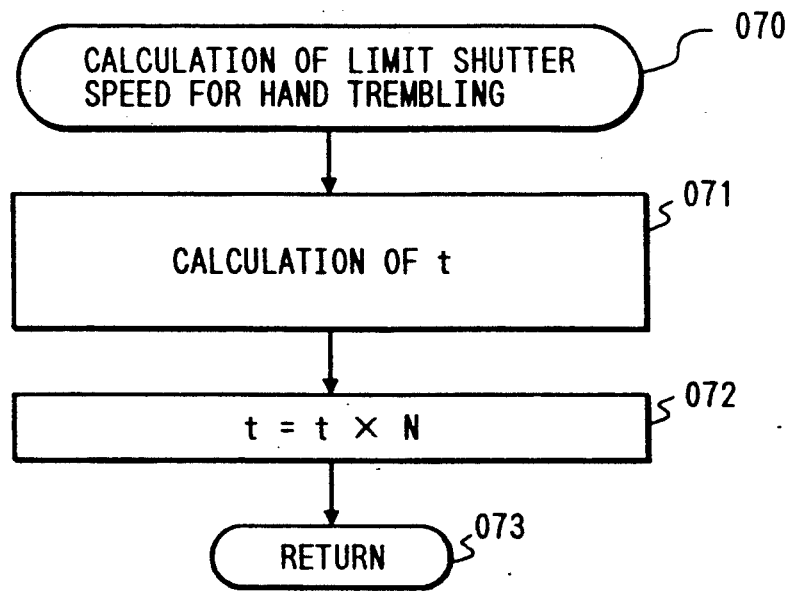
Figure 4E:
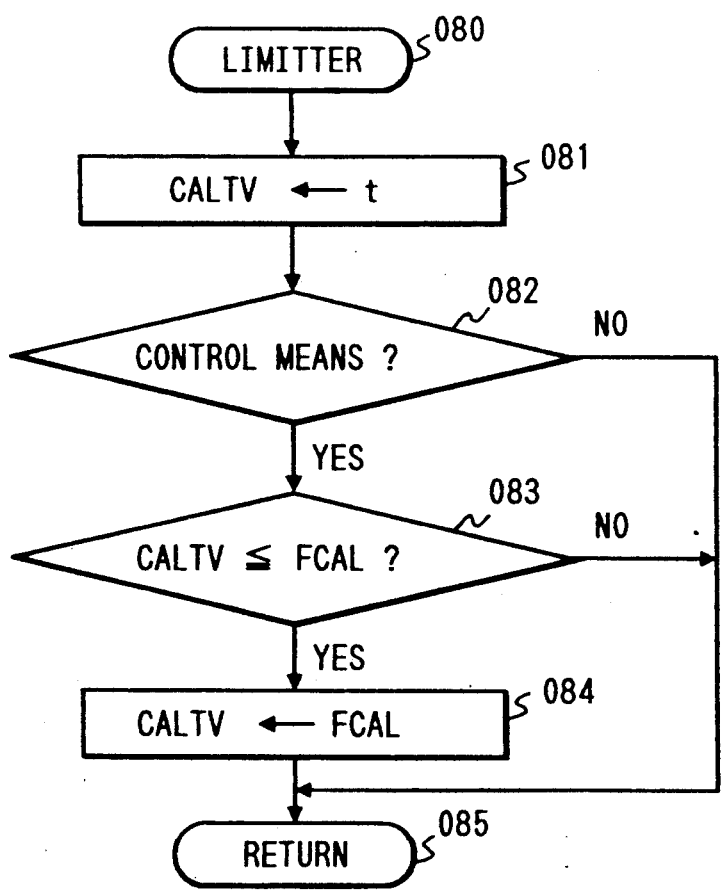
Figure 4F:
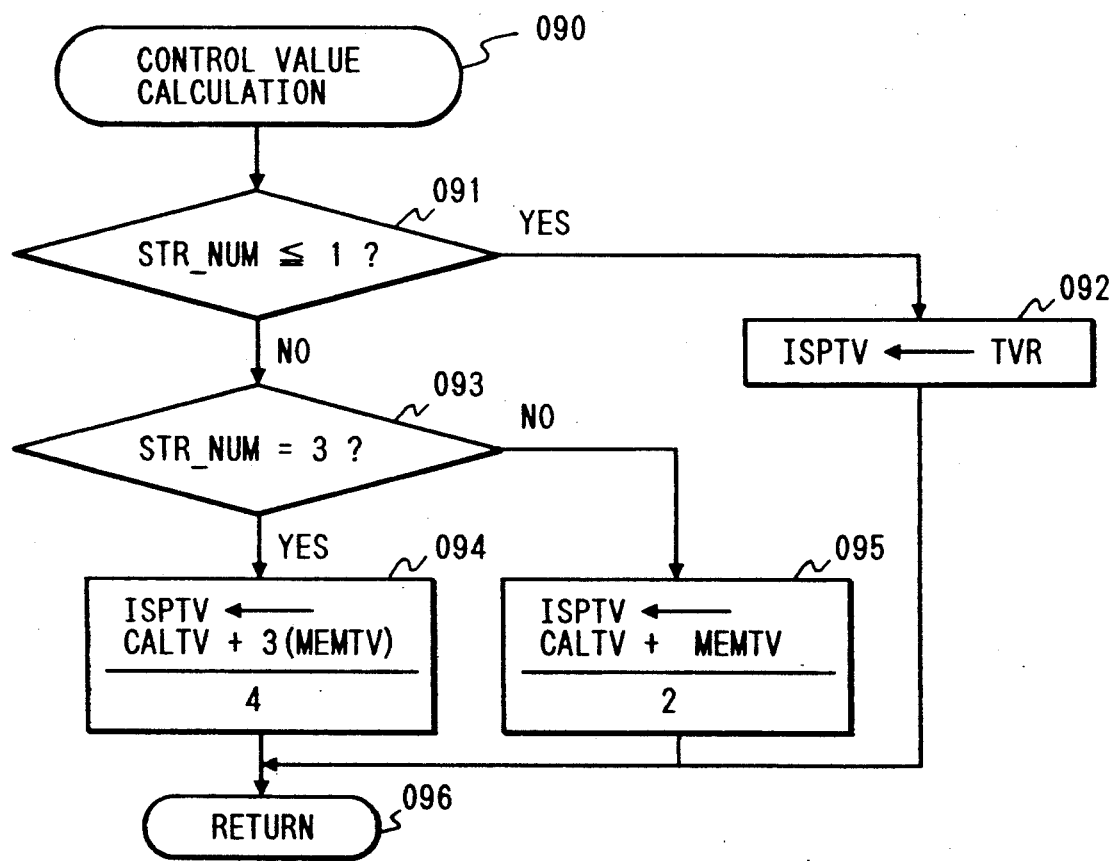
Figure 4G:
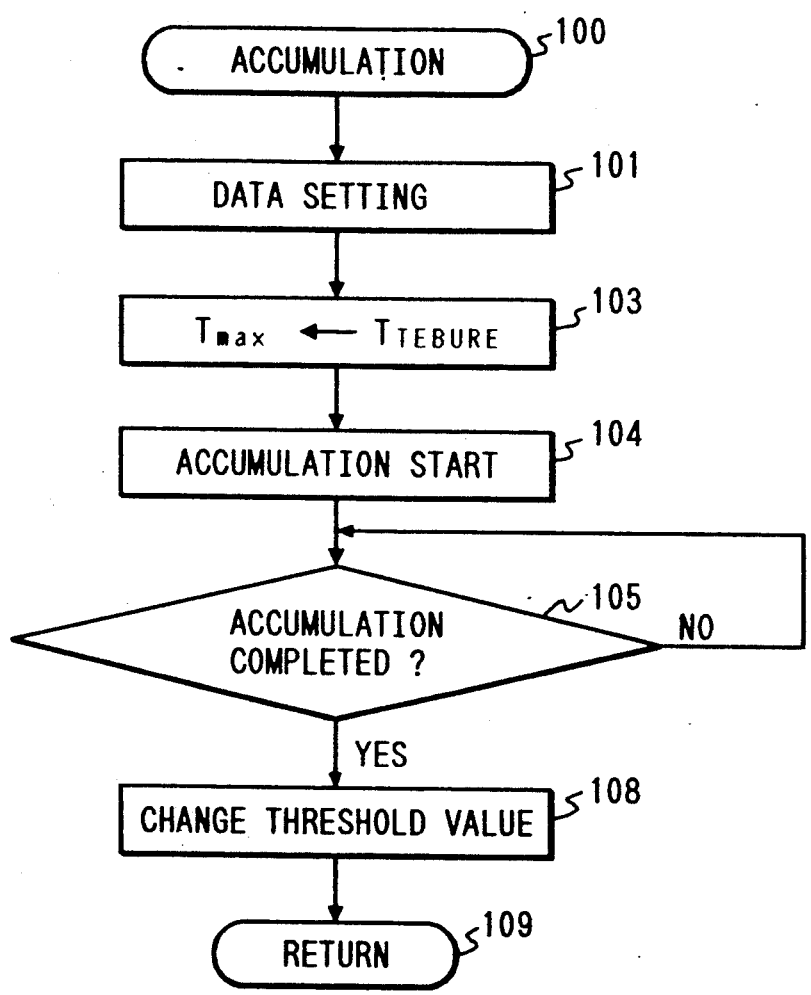

FIG. 4G is a flow chart of the "accumulation" subroutine executed in the above-mentioned step (032).

When said subroutine is called, the accumulating operation is executed, starting from a step (100).

At first, a step (101) executes initialization of data required for accumulation and the start of timers.

A next step (103) changes the maximum accumulation time $T_{max}$ to a value $T_{TEBURE}$ for the hand trembling detection mode. The maximum accumulation time, employed in the ordinary distance measurement, is selected at a relatively long time in the order of several hundred milliseconds, but such time deteriorates the response in the hand trembling detection control because of the long detection cycle. Consequently, the deterioration in response is prevented by reducing said time to several tens of milliseconds. Also the deterioration in the detecting ability resulting from the reduction in accumulating time is prevented by modifying the signal BTIME defining the timing for determining the readout gain of the image signal amplifier in the sensor drive circuit SDR. Said signal BTIME will not be explained further as it is already disclosed for example in the Japanese Laid-Open Patent Sho 63-216905 of the present assignee.

Then a step (104) initiates the charge accumulating operation.

A next step (105) awaits the completion of the accumulating operation. Details of said steps (104) and (105) will not be explained further as they are already disclosed in the above-mentioned Japanese Laid-Open Patent Sho 63-216905.

Then a step (108) varies the discriminating threshold value to a value for the hand trembling detection mode. Different from the data in the ordinary distance measurement, those of the image signals required for hand trembling detection are not obtained at a same time and will be lower in reliability, for example due to a signal level fluctuation in the image signal itself. Consequently, the detection of the hand trembling amount becomes impossible in most cases, if the threshold value for ordinary distance measurement is used. Use of a threshold value about twice as large as that for ordinary distance measurement allows the frequency of detection disabled states to be reduced without an unacceptable loss in reliability.

Then a step (109) terminates the "accumulation" subroutine.

Now, reference is made again to FIG. 4B.

After said step (032), a step (033) executes an "image change detection" subroutine, a flow chart of which is shown in FIG. 4C.

When said subroutine is called, the image change detection is executed starting from a step (050).

At first, a step (051) identifies the number STR-NUM of accumulation of image data required for hand trembling amount detection. If said number is zero, where the detection of the hand trembling amount is impossible, the sequence jumps to a step (061). If said number STR-NUM is "1" or larger, a step (052) calculates an image shift amount PRDCT-V of the central vertical sensor SNS-1. Said amount PRDCT-V indicates the difference between the image signal accumulated this time in the sensor SNS-1a and the image signal accumulated last time, which is retained in the step (061) to be explained later. A next step (053) calculates an image shift amount PRDCT-H of the central horizontal sensor SNS-4a in the same manner as in the step (052).

The actual hand trembling seldom occurs in one direction but mostly appears two-dimensionally in the horizontal and vertical directions. Such hand trembling cannot be detected with a high reliability if the detecting means is provided only in one direction. For this reason the steps (052) and (053) detect the image shift amounts in the vertical and horizontal directions, for improving the reliability of detection of the actual hand trembling amount.

Then a step (054) discriminates whether the central vertical sensor SNS-1 and the central horizontal sensor SNS-4 are both in a state capable of detection, based for example on the contrast of the image signals from said sensors. If both sensors are capable of detection, a step (055) compares the image shift amount of the sensor SNS-1a with that of the sensor SNS-4a, and, if the former is larger, the sequence proceeds to a step (057) for employing the image shift amount of the sensor SNS-1a for the image shift amount PRDCT to be used in the calculation of the hand trembling limit shutter speed. On the other hand, if the latter is larger, the sequence proceeds to a step (058) for employing the image shift amount of the sensor SNS-4a for said image shift amount PRDCT. Such selection of the larger image shift amount provides an improved assurance in the detection of the hand trembling amount. If the step (054) identifies that either of the sensors SNS-1, SNS-4 is incapable of detection, a step (056) discriminates whether the sensor SNS-1 is capable of detection, and, if capable, the sequence proceeds to a step (059) to employ the image shift amount of the sensor SNS-1a as the image shift amount PRDCT for calculating said limit shutter speed. On the other hand, if the sensor SNS-1 is incapable of detection, the sequence proceeds to a step (060) to employ the image shift amount of the sensor SNS-4a as the image shift amount PRDCT for said calculation.

Then a step (061) stores the image signals of the sensors SNS-1a, SNS-4a, required for calculating the image shift amounts next time.

A next step (062) discriminates whether the central vertical sensor SNS-1 and the central horizontal sensor SNS-4 are both incapable of detection, and, if both are incapable, the sequence proceeds to a step (065) to set the number STR-NUM of accumulation of the image data required for detection of hand trembling amount at "1", and then to a step (066).

If the step (062) identifies that at least either of the sensors is capable of detection, a step (063) discriminates whether number STR-NUM of accumulations of image data required for hand trembling amount detection does not exceed "2". If said number does not exceed "2", "1" is added to said number STR-NUM and the sequence proceeds to a step (066).

If the step (063) identifies that said number STR-NUM exceeds "2", the sequence proceeds to a step (066) to terminate the "image change detection" subroutine.

Now, reference is made again to FIG. 4B.

After the step (033), a step (034) discriminates the number of accumulations of the image data required for the hand trembling amount detection, and the sequence proceeds to a step (037) unless said number is at least equal to "2". If said number is at least equal to "2", indicating that the detection of the hand trembling amount is possible, a step (035) executes a "hand trembling limit shutter speed calculation" subroutine, the flow chart of which is shown in FIG. 4D.

When said subroutine is called, the calculation of the limit shutter speed for hand trembling is executed starting from a step (070).

At first, a step (071) calculates the limit shutter speed for hand trembling, according to the following basic principle.

It is assumed that a blurred photograph due to hand trembling does not occur under a photographing condition:

$$v \times t \leq \delta(mm)$$

wherein v is the image changing velocity (mm/s) on the focal plane, t is the shutter time (sec), and δ is the diameter of a tolerable aberration circle (0.035 mm).

Thus, the shutter time t is calculated by $t=0.035/v$ (s).

The image changing velocity v (mm/s) can be determined as:

$$v = r/ts \; (mm/s)$$

wherein r is the amount (mm) of image change on the focal plane, and ts (s) is the time of measurement of said change.

In the above-mentioned equation $v=r/ts$, the value r is proportional to the value PRDCT determined in the subroutine shown in FIG. 4C, and ts is the interval of fetching the image signal for determining said value PRDCT, namely the interval of execution of the subroutine shown in FIG. 4B, and can be represented by TM2-TM1 determined in the step (031). Consequently, the above-mentioned equation $t=0.035/v$ can be calculated from said value PRDCT and TM2-TM1, and said step (071) determines the value t from the above-mentioned equation. As will be apparent from the foregoing equation, the limit shutter time t for hand trembling becomes shorter as the image change per unit time is larger.

The limit shutter speed t for hand trembling is determined according to the above-explained basic principle.

Then a step (072) multiplies the value t, determined in the step (071), by a predetermined amount Said multiplication by a predetermined amount is to give additional safety by a shift by a certain amount toward the shorter time, and, as will be explained later, to prevent deterioration in response as the control value is calculated by averaging with a value obtained in the past.

A step (073) then terminates the subroutine for "calculation of limit shutter speed for hand trembling".

Now, reference is made again to FIG. 4B.

After the step (035), a step (036) executes a "limiter" subroutine, or the flow chart which is shown in FIG. 4E.

When this subroutine is called, the limiter sequence is executed starting from a step (080).

At first, a step (081) converts the shutter speed t, determined in the subroutine for "calculation of limit shutter speed for hand trembling", into a value CALTV in apex representation. Then, a step (082) discriminates whether a limiter mode has been selected, and, if not, the sequence proceeds to a step (085). If selected, a step (083) compares the value CALTV with a value FCAL, which is the apex representation of the reciprocal of the focal length of the phototaking lens, and, if the former is larger, namely if the shutter speed is faster than the reciprocal FCAL of the focal length of the phototaking lens, the sequence proceeds to the step (085).

On the other hand, if the former is smaller, namely if the shutter speed CALTV is slower than the reciprocal of the focal length of the phototaking lens, the sequence proceeds to a step (084) to set the shutter speed CALTV at the reciprocal of said focal length.

A next step (085) terminates the execution of the "limiter" subroutine. The above-mentioned limiter mode can be set in a similar manner as the AF modes.

Now, reference is again made to FIG. 4B.

After the step (036), a step (037) executes a "control value calculation" subroutine, of the flow chart which is shown in FIG. 4F.

When this subroutine is called, the calculation of the control value is executed, starting from a step (090).

At first, a step (091) discriminates whether the number STR-NUM of accumulations of image data required for hand trembling detection exceeds "1", and, if not, the sequence proceeds to a step (092). In this case the detection of the hand trembling amount is not possible because of the insufficient accumulated data. Thus, the value TVR of the shutter speed TV based on the ordinary light metering is selected as the actual control value ISP-TV, and the sequence then proceeds to a step (096). Said value TVR corresponds to the output of light metering determined in the AE control subroutine shown in FIG. 4A. On the other hand, if the step (091) identifies that said number STR-NUM exceeds "1", a step (093) discriminates whether said number STR-NUM is "3", and the sequence proceeds to a step (094) or (095) respectively if said number is "3" or not.

The basic principle of control value calculation is as follows. If the shutter speed calculated from the hand trembling amount is displayed in each detection cycle, the display fluctuates significantly, thus giving an unreliable feeling to the user. The display, however, can be stabilized by averaging the current shutter speed with the past control value, with certain weighting on the latter.

In the step (094), where the number of accumulations of the image data is at least "3", the control value ISP TV is determined by the following formula in order to reflect the past results with weighting:

$$ISP \; TV \leftarrow \frac{CALTV + 3(MEMTV)}{4}$$

wherein MEM TV is the control value ISP TV obtained in the preceding hand trembling detection, determined in a step (039) to be explained later.

After this calculation, the sequence proceeds to a step (096).

In the step (095), where the number of accumulation of image data is equal to "2", the control value ISP TV is determined by the following formula taking the average with the preceding result:

$$ISP \; TV \leftarrow (CALTV + MEMTV)/2$$

After this calculation, the sequence also proceeds to the step (096) to terminate the execution of the "control value calculation" subroutine.

Now, reference is made again to FIG. 4B.

After the execution of the step (037), a step (038) memorizes the current accumulation start time TM2, detected in the step (031), as the time TM1 for the next hand trembling detection. Then a step (039) memorizes the control value ISP TV, determined by the current hand trembling detection control, as the value MEMTV for the next hand trembling detection. Subsequently, the sequence proceeds to a step (040) to terminate the execution of the "hand trembling detection control" subroutine.

In summary, the above-explained "hand trembling detection control" subroutine detects the image signal accumulated in the sensor SNS-1a or SNS-4a with a predetermined interval (TM2-TM1), then determines the image signal shift amounts PRDCT-V and PRDCT- H in said interval by the subroutine shown in FIG. 4C, determines the limit shutter speed for hand trembling based on the larger shift amount, by the subroutine shown in FIG. 4D, then averages said limit shutter speed with the shutter speed in the past with suitable weighting according to the subroutine shown in FIG. 4F, and sets the thus-averaged shutter speed as the control shutter speed ISP TV. Therefore, when the shutter is released, the shutter speed is controlled by said value ISP TV, whereby the photograph is taken without blur even in the presence of hand trembling. Also as explained in the foregoing, when the hand trembling detection mode is selected, the auto focusing is conducted in the one-shot mode, so that the hand trembling detection control by the above-explained image shift amount detection can be exactly conducted after the in-focus state is reached. Furthermore, even if the focus detection is not possible, the emission of auxiliary light is inhibited to avoid unnecessary energy consumption.

What is claimed is:

1. A camera with focus detecting device, ɸcomprising:
   a) a sensor circuit for receiving the light from an object;
   b) a focus detecting circuit for effecting focus detection based on the output of said sensor circuit;
   c) an auxiliary light control circuit for controlling an auxiliary light source, when the focus detection by said focus detecting circuit is impossible, to cause light emission to said object;
   d) a drive circuit for driving an imaging optical system according to a focus state detected by said focus detecting circuit;
   e) a hand trembling detection circuit for detecting the hand trembling state based on the output of said sensor circuit;
   f) a selection circuit for selecting the activation or deactivation of said hand trembling detection circuit; and
   g) an inhibition circuit for deactivating said auxiliary light control circuit when said hand trembling detection circuit is activated by said selection circuit.

2. A camera according to claim 1, wherein said hand trembling detection circuit is adapted, when it is activated by said selection circuit, to function after an in-focus state is identified by said focus detection circuit.

3. A camera with an automatic focusing device which includes a focus detection circuit for receiving the light from an object by a sensor and detecting the focus state based on the output of said sensor and drives an imaging optical system for focusing according to the focus state detected by said focus detection circuit, comprising:
   a) a setting circuit for setting a hand trembling detection mode;
   b) an auxiliary light control circuit for driving an auxiliary light source under a situation where the focus detection is impossible;
   c) a hand trembling detection circuit for detecting a hand trembling state based on the output of said sensor when the hand trembling detection mode is set by said setting circuit; and
   d) an inhibition circuit for inhibiting the function of said auxiliary light control circuit when the hand trembling detection mode is set.

4. A camera according to claim 3, further comprising a sequence control circuit for activating, when said hand trembling detection mode is set, said hand trembling detection circuit after the completion of focusing operation by said automatic focusing device, wherein the function of said auxiliary light control circuit is inhibited by said inhibition circuit at the focus detection for said automatic focusing.

5. A camera according to claim 1, wherein said hand trembling detection circuit is adapted to determine a shutter time capable of avoiding hand trembling, based on the output of said sensor.

6. A camera according to claim 3, wherein said hand trembling detection circuit is adapted to determine a shutter time capable of avoiding hand trembling, based on the output of said sensor.

7. A camera with an automatic focusing device which includes a focus detection circuit for receiving the light from an object by a sensor and detecting the focus state based on the output of said sensor and drives an imaging optical system for focusing according to the focus state detected by said focus detection circuit, comprising:
   a) a setting circuit for setting a hand trembling detection mode;
   b) an auxiliary light control circuit for driving an auxiliary light source under a situation where the focus detection is impossible;
   c) a hand trembling detection circuit for detecting a hand trembling state based on the output of said sensor when the hand trembling detection mode is set by said setting circuit; and
   d) a control circuit enabling the function of said auxiliary light control circuit during the function of said automatic focusing device when said hand trembling detection mode is not set, but inhibiting the function of said auxiliary light control circuit during the function of said automatic focusing device when said hand trembling detection mode is set.

8. A camera with an automatic focusing device having a first auto focusing mode for repetitively performing an automatic focusing operation comprising a focus detecting operation and a lens driving operation based on a focus signal obtained in said focus detecting operation, and a second auto focusing mode for inhibiting the automatic focusing operation after an in-focus state is identified in the focus detecting operation, comprising:
   a) a hand trembling detection circuit for detecting the hand trembling state of the camera;
   b) selection means for activating or deactivating said hand trembling detection circuit;
   c) a mode switching circuit for automatically setting said automatic focusing device at said second auto focusing mode when the function of said hand trembling detection circuit is activated by said selection means.

9. A camera according to claim 8, further comprising a manual operation member for manually setting said first or second auto focusing mode, and wherein said mode switching circuit selects the second auto focusing mode when said selection means activates the function of said hand trembling detection circuit, regardless of the mode setting by said manual operating member.

10. A camera according to claim 8, further comprising a sequence control circuit for activating said hand trembling detection circuit after the completion of the automatic focusing operation in the second auto focusing mode.

11. A camera according to claim 8, wherein said hand trembling detection circuit is adapted to calculate a shutter time capable of avoiding hand trembling.

12. A camera system having an automatic focusing device which performs focus adjustment based on an output of a sensor for receiving light beams from an object, comprising:
   (a) an auxiliary light emission circuit for projecting auxiliary light under a situation where the focus detection is impossible;
   (b) a hand trembling detection circuit for detecting a hand trembling state of the camera;
   (c) a selection circuit for selecting whether the hand trembling detecting operation is actually performed or not; and
   (d) a prohibition circuit for prohibiting an operation of said auxiliary light emission circuit when the execution of the hand trembling detection operation is selected by said selection circuit.

13. A camera with an automatic focusing device having a first auto focusing mode for repetitively performing an automatic focusing operation and a lens driving operation based on a focus signal obtained in said focus detecting operation, and a second auto focusing mode for inhibiting the automatic focusing operation after an in-focus state is identified in the focus detecting operation, comprising:
   (a) a hand trembling detection circuit for detecting the hand trembling state of the camera; and
   (b) a control circuit for permitting said hand trembling detection circuit to operate when said auto focusing operation is performed under the second auto focusing mode, and for prohibiting said hand trembling detection circuit from operation when said auto focusing operation is performed under the first auto focusing mode.

* * * * *

UNITED STATES PATENT AND TRADEMARK OFFICE
CERTIFICATE OF CORRECTION

PATENT NO. : 5,194,888
DATED : March 16, 1993
INVENTOR(S) : AKIRA AKASHI, ET AL.

It is certified that error appears in the above-indentified patent and that said Letters Patent is hereby corrected as shown below:

TITLE PAGE

[30] FOREIGN PRIORITY APPLICATION DATA

Insert: --[30] Foreign Application Priority Data
Jan. 31, 1990 [JP] Japan...2-020719--.

[56] REFERENCES CITED

FOREIGN PATENT DOCUMENTS

"60-166911  1/1986  Japan" should read
--61-166911  1/1986  Japan--.

IN THE DRAWINGS

IN FIGURE 4B

"LIMITTER" should read --LIMITER--.

IN FIGURE 4E

"LIMITTER" should read --LIMITER--.

UNITED STATES PATENT AND TRADEMARK OFFICE
CERTIFICATE OF CORRECTION

PATENT NO. : 5,194,888
DATED : March 16, 1993
INVENTOR(S) : AKIRA AKASHI, ET AL.

It is certified that error appears in the above-indentified patent and that said Letters Patent is hereby corrected as shown below:

COLUMN 1

Line 15, "Sho 60-166911" should read --Sho 61-166911--.
Line 32, "in" (first occurrence) should read --in an--.

COLUMN 2

Line 5, "embodiments,." should read --embodiments,--.
Line 9, "fb" should read --1b--.
Line 10, "sequence" should read --the control sequence--.
Line 66, "light the" should read --the light--.

COLUMN 3

Line 23, "terminal," should read --terminal--; and "electric," should read --electric--.

COLUMN 4

Line 24, "focus" should read --the focus--.

UNITED STATES PATENT AND TRADEMARK OFFICE
CERTIFICATE OF CORRECTION

PATENT NO. : 5,194,888
DATED : March 16, 1993
INVENTOR(S) : AKIRA AKASHI, ET AL.

It is certified that error appears in the above-indentified patent and that said Letters Patent is hereby corrected as shown below:

COLUMN 6

Line 10, "TE1-TINTE4" should read --TE1-/TINTE4--.

COLUMN 7

Line 33, "applicant" should be deleted.
    Line 36, "step (0.3)" should read --step (013)--.
    Line 37, "if," should read --if--.
    Line 52, "is" should read --has once been--.

COLUMN 8

Line 56, "preceding" should read --the preceding--.

COLUMN 11

Line 32, "amount" should read --amount.--.
    Line 43, "or the flow chart" should read --the flow chart of--.

UNITED STATES PATENT AND TRADEMARK OFFICE
CERTIFICATE OF CORRECTION

PATENT NO. : 5,194,888
DATED : March 16, 1993
INVENTOR(S) : AKIRA AKASHI, ET AL.

It is certified that error appears in the above-indentified patent and that said Letters Patent is hereby corrected as shown below:

COLUMN 12

Line 2, "of the flowchart" should read --the flow chart of--.
    Line 26, "display, however, can be" should read --display can, however, be--.

COLUMN 13

Line 21, "øcompris-" should read --compris- --.

Signed and Sealed this

Nineteenth Day of April, 1994

Attest:

BRUCE LEHMAN

*Attesting Officer*      *Commissioner of Patents and Trademarks*